US009444233B2

(12) United States Patent
Valdes et al.

(10) Patent No.: US 9,444,233 B2
(45) Date of Patent: Sep. 13, 2016

(54) METHODS, SYSTEMS, AND APPARATUS FOR AUTOMATED MAINTENANCE MODE SWITCHING

(75) Inventors: Marcelo Esteban Valdes, Burlington, CT (US); Marty Lynn Trivette, Hartford, CT (US); Anurag Arjundas Jivanani, Unionville, CT (US)

(73) Assignee: General Electric Company, Schenectady, NY (US)

( * ) Notice: Subject to any disclaimer, the term of this patent is extended or adjusted under 35 U.S.C. 154(b) by 970 days.

(21) Appl. No.: 13/598,298

(22) Filed: Aug. 29, 2012

(65) Prior Publication Data
US 2014/0062222 A1  Mar. 6, 2014

(51) Int. Cl.
*H02H 11/00* (2006.01)
*H02B 11/133* (2006.01)

(52) U.S. Cl.
CPC ................ *H02B 11/133* (2013.01)

(58) Field of Classification Search
CPC .................................... H02B 11/133
USPC ...................................... 307/326
See application file for complete search history.

(56) References Cited

U.S. PATENT DOCUMENTS

| 6,055,145 A | 4/2000 | Lagree et al. |
| 6,297,939 B1 | 10/2001 | Bilac et al. |
| 7,203,040 B2* | 4/2007 | Shipp et al. ............... 361/5 |
| 7,252,431 B1* | 8/2007 | Caramanna ............... 374/147 |
| 8,032,260 B2 | 10/2011 | Hill, III et al. |
| 8,142,221 B2* | 3/2012 | Malstron ............ H01R 13/665 439/489 |
| 8,351,171 B2* | 1/2013 | Payack ....................... 361/62 |
| 2004/0060980 A1* | 4/2004 | Shibata et al. ............. 235/381 |
| 2006/0049026 A1* | 3/2006 | Weister et al. ........... 200/50.17 |
| 2010/0133922 A1 | 6/2010 | Payack |
| 2011/0063202 A1 | 3/2011 | Hameed et al. |
| 2011/0128005 A1 | 6/2011 | Weiher |
| 2012/0014026 A1* | 1/2012 | Narel et al. ................ 361/95 |
| 2012/0211335 A1* | 8/2012 | Pearce ................... H02B 11/10 200/50.24 |
| 2012/0305369 A1* | 12/2012 | Greer et al. ............. 200/50.24 |

OTHER PUBLICATIONS

Sachau, Mike "Siemens Dynamic Arc Flash Reduction System and its application in motor control centers," Siemens, Jul. 1, 2009, pp. 1-8.

* cited by examiner

*Primary Examiner* — Jared Fureman
*Assistant Examiner* — Duc M Pham
(74) *Attorney, Agent, or Firm* — General Electric Company (57) ABSTRACT

Methods, devices, and systems for automated maintenance mode switching are described. An example method of controlling a protection assembly mode of operation is described for use in a system having a protection assembly configured to receive power from an upstream power source and provide power and protection to a downstream protection device moveable between a fully engaged position and a fully disengaged position. The method includes determining, by the protection assembly, when a maintenance action is being performed on the downstream protection device, and switching the protection assembly from a normal protection mode to a maintenance mode of operation in response to determining the maintenance action is being performed on the downstream protection device.

19 Claims, 8 Drawing Sheets

METHODS, SYSTEMS, AND APPARATUS FOR AUTOMATED MAINTENANCE MODE SWITCHING

BACKGROUND OF THE INVENTION

The embodiments described herein relate generally to protection systems and, more particularly, to methods, systems, and apparatus for automated switching to a maintenance mode.

Known electrical distribution systems include a plurality of protection devices within equipment such as switchgear. The protection devices may be circuit breakers, or similar devices, that are coupled to one or more loads. The protection devices typically include a trip mechanism that measures current flowing to the loads and causes the device to trip if the current is outside of acceptable operating conditions. In some systems, one or more protection device provides power and protection to other protection devices located on a bus or another downstream protection device.

At least some known protection devices are operable in at least two protection modes: a normal protection mode and a maintenance mode. In the normal protection mode, current thresholds (also known as "pickup" thresholds) that identify undesired current levels are set to protect equipment, such as a load or other protection devices. The maintenance mode is commonly activated by a person when the person will be interacting with a load or protection device downstream from a protection device. In the maintenance mode, the protection device's settings are adjusted to make it more sensitive to undesired current levels and, if possible, decrease the amount of time needed by the protection device to react to an undesired current level. Thus, a protection device is easier and/or quicker to trip when the maintenance mode is enabled. The maintenance mode of a protection device is typically manually enabled and disabled by a person. Failure of a person to enable a maintenance mode in a protection device in some known systems increases the danger to a person working downstream from the protection. Failure to return the protection device from the maintenance mode to the normal protection mode may increase the likelihood that the protection device will trip unnecessarily.

BRIEF DESCRIPTION OF THE INVENTION

In one aspect of the present disclosure, a protection assembly includes a chassis, a protection device mounted to the chassis, and a first position sensor assembly coupled to the chassis. The chassis is configured to permit movement of the protection device between a plurality of positions relative to the chassis. The first sensor assembly is configured to detect a position of the protection device relative to the chassis and generate a signal indicating the position of the protection device.

In another aspect, a protection assembly includes a protection device configured to receive power from an upstream power source and provide power and protection to a downstream protection device, and a controller communicatively coupled to the protection device. The downstream device is moveable between a fully engaged position and a fully disengaged position. The protection device is operable in a normal protection mode and a maintenance protection mode. The controller is configured to switch the protection device from the normal protection mode to the maintenance protection mode based at least in part on a signal from the downstream protection device indicating the downstream protection device is not in either the fully engaged position or the fully disengaged position.

In another aspect, a method of controlling a protection assembly operation mode is described. The method is for use in a system having a protection assembly configured to receive power from an upstream power source and provide power and protection to a downstream protection device moveable between a fully engaged position and a fully disengaged position. The method includes determining, by the protection assembly, when a maintenance action is being performed on the downstream protection device, and switching the protection assembly from a normal protection mode to a maintenance mode of operation in response to determining the maintenance action is being performed on the downstream protection device.

DETAILED DESCRIPTION OF THE INVENTION

Exemplary embodiments of a method, device, and system for automated switching of a protection device to a maintenance mode are described herein. These embodiments facilitate improving protection of persons from dangers arising from electrical equipment. The exemplary embodiments detect a maintenance action performed on a downstream protection assembly and automatically switch an upstream protection device to a maintenance mode. Thus, protection devices are automatically switched to a maintenance mode when a person is interacting with a protection assembly protected by the protection devices without a person needing to remember to manually switch to a maintenance mode. Moreover, when the maintenance action is no longer being performed on the downstream protection assembly, as determined by the upstream protection device or assembly, the upstream protection device is automatically switched back to a normal protection mode of operation. Thus, a person does not need to remember to return the upstream protection device to the normal protection mode and nuisance trips of the upstream protection device may be reduced following completion of a maintenance action.

Figure 1:
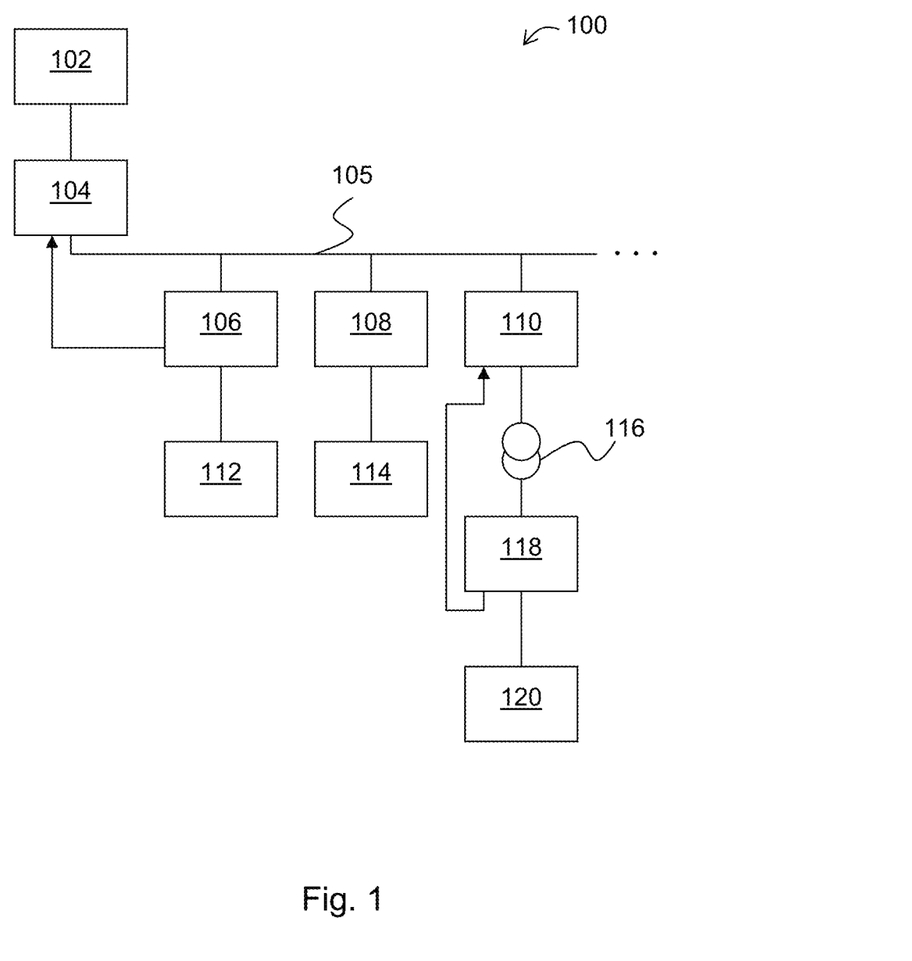
FIG. 1 is a schematic block diagram of an exemplary power system.

FIG. 1 is a schematic block diagram of an exemplary power system 100. Power system 100 includes a power source 102 to deliver power to a protection assembly 104. Power source 102 may be any power source suitable for providing power to system 100 including, for example, a battery, a power converter, an electric utility grid, another protection assembly, etc. Power from power source 102 passes through protection assembly 104 to a bus 105 to provide power to a plurality of downstream protection assemblies, including protection assemblies 106, 108, and 110. Protection assemblies 106 and 108 provide power and protection to loads 112 and 114, respectively. Protection assembly 110 is coupled, via a transformer 116, to a protection assembly 118. Protection assembly 118 provides power and protection to a load 120. Loads 112, 114, and 120 may include, but are not limited to only including, machinery, motors, lighting, and/or other electrical and mechanical equipment of a manufacturing or power generation or distribution facility.

In the exemplary embodiment, each protection assembly 106, 108, 110, and 118 is communicatively coupled to an upstream protection assembly. Specifically, protection assemblies 106, 108, and 110 are coupled in communication with protection assembly 104, and protection assembly 118 is coupled in communication with protection assembly 110. For clarity, only the communicative coupling of protection assembly 106 to protection assembly 104, and the coupling of protection assembly 118 to protection assembly 110 are illustrated in FIG. 1.

Protection assemblies 104, 106, 108, 110, and 118 are operable in at least two modes of operation, a normal protection mode and a maintenance protection mode. In other embodiments, less than all of protection assemblies 104, 106, 108, 110, and 118 are operable in different modes of operation and/or one or more of protection assemblies 104, 106, 108, 110, and 118 may be operable in more than two operation modes. In the normal protection mode, protection assemblies 104, 106, 108, 110, and 118 operate with preset operating parameters for normal or ordinary conditions, while in the maintenance protection mode a different set of operating parameters is used to increase the protection provided and/or reduce the potential for damage or injury to persons or equipment. For example, current pickup thresholds are reduced and reaction times increased (if possible) in the maintenance protection mode to facilitate a more sensitive and faster response to potential problems such as short circuits. As will be explained in more detail below, protection assemblies 104 and 110 are configured to determine when a maintenance action is being performed on a downstream protection device 106, 108, 110, or 118 and switch operation from the normal protection mode to the maintenance protection mode in response to this determination. As used herein performance of a maintenance operation includes steps preparatory to performing a maintenance operation. In the exemplary embodiment, automatic maintenance mode selection by the protection assembly may be disabled by a person. Moreover, one or more protection assembly 104, 106, 108, 110, and 118 may be manually placed in maintenance mode by a person.

Figure 2:
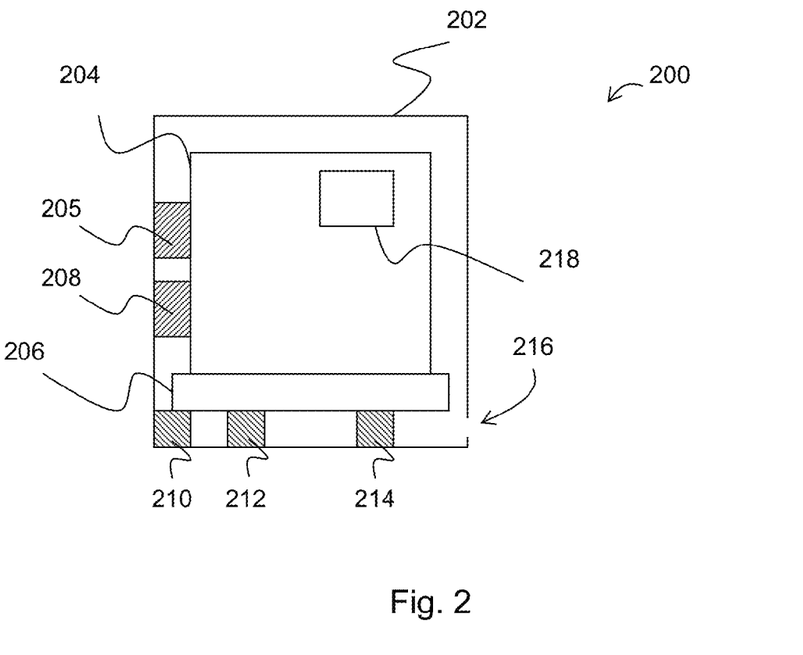
FIG. 2 is a simplified cross-sectional diagram of a protection assembly in a fully engaged position.
Figure 3:
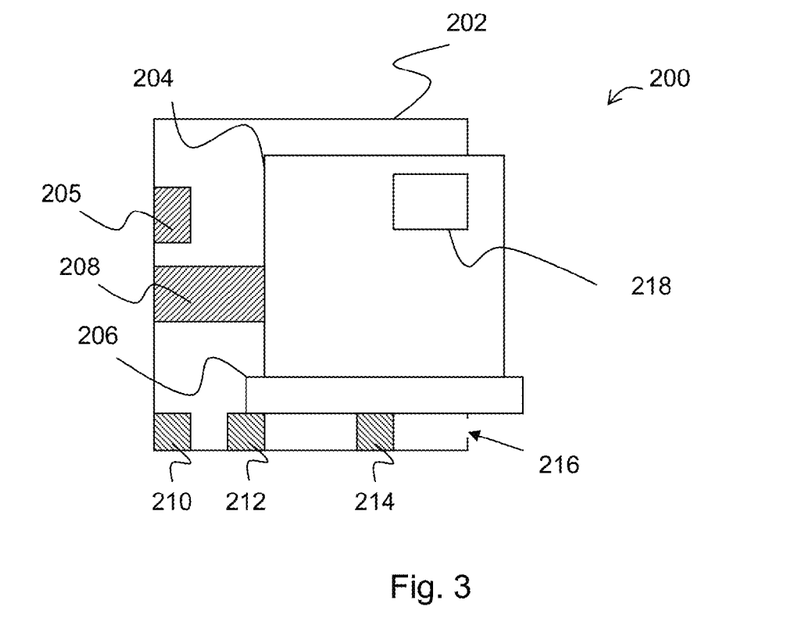
FIG. 3 is a simplified cross-sectional diagram of a protection assembly in an intermediate position.
Figure 4:
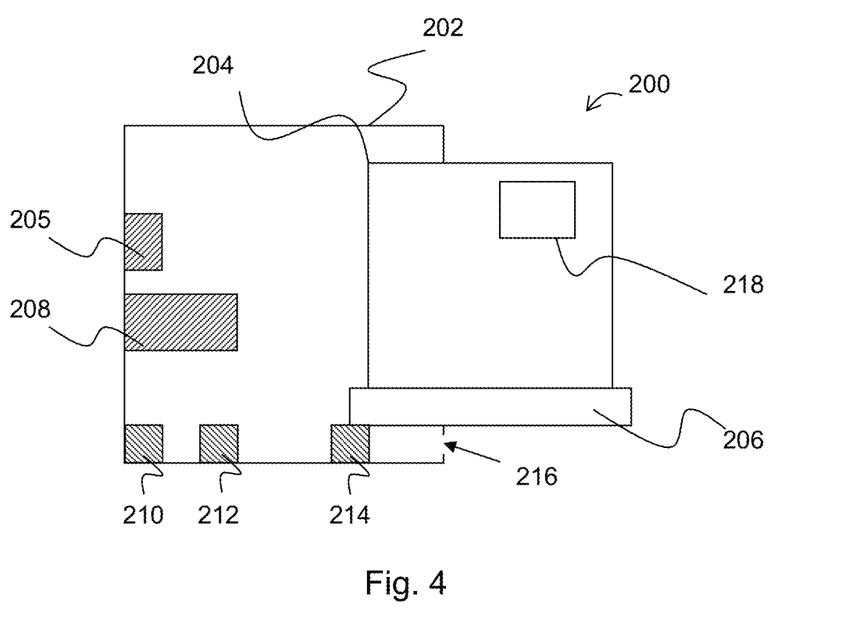
FIG. 4 is a simplified cross-sectional diagram of a protection assembly in a fully disengaged position.

FIGS. 2-4 are simplified cross-sectional diagrams of a protection assembly 200 that may be used in system 100 as one or more of protection assemblies 104, 106, 108, 110, and 118. Each protection assembly 200 includes a chassis 202 (also sometimes referred to as a housing cubicle). A protection device 204 is housed within chassis 202 and coupled to receive electric power, such as from power source 102 or bus 105, through main terminals 205. In the exemplary embodiment, protection device 204 is a circuit breaker assembly. In other embodiments, protection device 204 may be any protection device suitable for protecting circuits, equipment, other protection devices, and/or nearby bodies. In some embodiments, protection device 204 may include one or more circuit breakers, such as circuit switches, circuit interrupters, and/or crowbars, and/or one or more arc containment devices. An exemplary arc containment device includes, for example, a containment assembly, a plurality of electrodes, a plasma gun, and a trigger circuit that causes the plasma gun to emit ablative plasma into a gap between the electrodes to divert energy into the containment assembly from an arc or other electrical fault that is detected on the circuit.

Protection assembly 200 is a draw-out or drawer style protection assembly. Protection device 204 is coupled to side rails 206, which in turn are coupled to chassis 202. Side rails 206 permit protection device 204 to be moved relative to chassis 202 between a fully engaged position (shown in FIG. 2) and a fully disengaged position (shown in FIG. 4). In the fully engaged position, protection device 204 is coupled to receive power, for example from voltage bus 105 or power source 102, and to provide the power to a load (e.g., load 112 or 114) or another protection assembly (e.g., protection assembly 106, 108, 110, or 118). In the fully disengaged position, protection device 204 is physically and electrically separated from power system 100, such that no power from power source 102 or bus 105 flows into or out of protection device 204. In the exemplary embodiment, protection assembly includes an intermediate position (shown in FIG. 3). The intermediate position is sometimes referred to as a test position. In the intermediate position, protection device 204 is physically and electrically separated from main terminals 205, and thus from power source 102 and bus 105, but remains connected to lower voltage signal wiring, such as via signal contact 208. In the exemplary embodiment, moving protection device 204 relative to chassis 202 is a maintenance action. Moreover, steps taken to prepare protection device 204 and/or protection assembly 200 for such movement are also maintenance actions. In other embodiments, other actions additionally or alternatively are maintenance actions.

Protection assembly 200 includes sensors configured to detect the position of protection device 204. Signals from the sensors are provided to one or more upstream protection assemblies to which the downstream protection assembly is communicatively coupled. As used herein, signals from sensors, including the position sensors, include the absence of signals from one or more sensors. The sensor signals are used by the upstream protection assembly to determine when a maintenance action is being performed on a downstream protection. In response to determining that a maintenance action is being performed on the downstream protection device, the upstream protection device switches from the normal protection mode to the maintenance protection mode. Moreover, in response to determining that a maintenance action is no longer being performed on the downstream protection device, the upstream protection device switches from the maintenance mode to the normal protection mode of operation. In some embodiments, the upstream protection device delays switching to the normal protection mode for a period of time following the determination that the maintenance action is completed.

Protection assembly 200 includes sensors 210, 212, and 214 configured to detect the position of protection device 204 relative to chassis 202. In the exemplary embodiment, sensors 210, 212, and 214 are position switches. The position switches may be mechanical, magnetic, or any other suitable position indicating switch. In other embodiments, any other type of sensor suitable for detecting the position of protection device 204 may be used. Each sensor 210, 212, and 214 detects the presence of protection device 204 at a particular position. For example, sensor 210 detects when protection device 204 is in the fully engaged position of FIG. 2, sensor 212 detects when protection device 204 is in the intermediate position of FIG. 3, and sensor 214 detects when protection device 204 is in the fully disengaged position shown in FIG. 4. In other embodiments, a logical combination of sensors 210, 212, and 214 is used to identify the position of protection device 204. For example, when all sensors 210, 212, and 214 detect the presence of protection device 204, it is determined that protection device 204 is in the fully engaged position, while it is determined that the protection device 204 is in the fully disengaged position when only sensor 214 detects the presence of protection device 204. Moreover, in some embodiments, more or fewer sensors are used and/or different types of sensors are used.

Protection device 204 is moved between positions relative to chassis 202 in protection assembly 200 using a positioning mechanism (not shown). Protection assembly 200 includes one or more sensors configured to detect when the positioning mechanism is being used and/or being readied/prepared for use. Signals from the sensor(s) are provided to one or more upstream protection assemblies to which the downstream protection assembly is communicatively coupled. In the exemplary embodiment, the positioning mechanism includes a removable hand crank (not shown). In another embodiment, an electronic actuator, motor, motorized crank, or other suitable positioning mechanism for moving protection device 204 may be used. In the exemplary embodiment, to prepare to move protection device 204 between positions, a cover (not shown) over a racking port 216 is moved to expose racking port 216. The hand crank is inserted into racking port 216 and rotated by a person to cause protection device 204 to move relative to chassis 202. A sensor (not shown) detects when racking port 216 is accessed by a person. In the exemplary embodiment, the sensor detects when a cover (not shown) to racking port 216 is opened to permit the hand crank to be inserted through racking port 216. In other embodiments, the sensor detects when the hand crank is inserted into racking port 216.

In other embodiments, protection device 204 includes one or more additional sensors configured to detect an action or characteristic of protection device 204 and provide such detection to an upstream protection device. For example, in some embodiments, protection device 204 includes a locking mechanism (not shown) to lock protection device 204 in position relative to chassis 202. In some embodiments, a sensor is coupled to the locking mechanism and configured to detect whether or not the locking mechanism is locked. Thus, for example, when protection device 204 is in the fully engaged position and the locking mechanism is locked, unlocking the locking mechanism in preparation of moving protection device is detected by the sensor and may be used by an upstream device, alone or in combination with other signals, to determine that protection device 200 is being prepared for movement. In other embodiments, signals from other suitable sensors may be used, alone or in combination, by an upstream protection assembly to determine that a maintenance action is being performed on the downstream protection assembly.

In the exemplary embodiment, protection assembly 200 includes a controller 218 (also known as a trip or protective relay) coupled to protection device 204. Controller 218 is configured to control protection device 204. Specifically, controller 218 stores and sets one or more settings, such as trip thresholds, etc. for protection device 204. In some embodiments, controller 218 monitors voltage, current, temperature, etc. and instructs protection device 204 to provide its protection (e.g., when to trip). In some embodiments, controller is integrated within protection device 204. In other embodiments, controller 218 is separate from protection device 204. In some such embodiments, controller 218 is integrated in protection assembly 200, while in other embodiments controller 218 is remote from protection assembly 200 and may control more than one protection assembly 200 or protection device 204.

When installed upstream of other protection assemblies in a system, such as system 100 for example, controller 218 is communicatively coupled to one or more downstream protection assemblies to receive sensor information from the downstream protection assemblies as described above. Based at least in part on this received sensor information, controller 218 determines when a maintenance action is performed on any of the downstream protection assemblies. If automatic maintenance mode selection is enabled in controller 218, in response to determining that a downstream protection assembly is experiencing a maintenance action, controller 218 switches its protection device 204 from the normal protection mode to the maintenance protection mode.

In the exemplary embodiment controller 218 includes a processor and memory (neither shown). It should be understood that the term "processor" refers generally to any programmable system including systems and microcontrollers, reduced instruction set circuits (RISC), application specific integrated circuits (ASIC), programmable logic circuits, and any other circuit or processor capable of executing the functions described herein. The above examples are exemplary only, and thus are not intended to limit in any way the definition and/or meaning of the term "processor." The memory stores program code and instructions, executable by the processor, to control and/or monitor switchgear units 106. Memory may include, but is not limited to only include, non-volatile RAM (NVRAM), magnetic RAM (MRAM), ferroelectric RAM (FeRAM), read only memory (ROM), flash memory and/or Electrically Erasable Programmable Read Only Memory (EEPROM). Any other suitable magnetic, optical and/or semiconductor memory, by itself or in combination with other forms of memory, may be included in memory. Memory may also be, or include, a detachable or removable memory, including, but not limited to, a suitable cartridge, disk, CD ROM, DVD or USB memory. In other embodiments, controller 218 includes any other suitable controls including, for example, analog circuits, logic machines, relays, etc.

Figure 5:
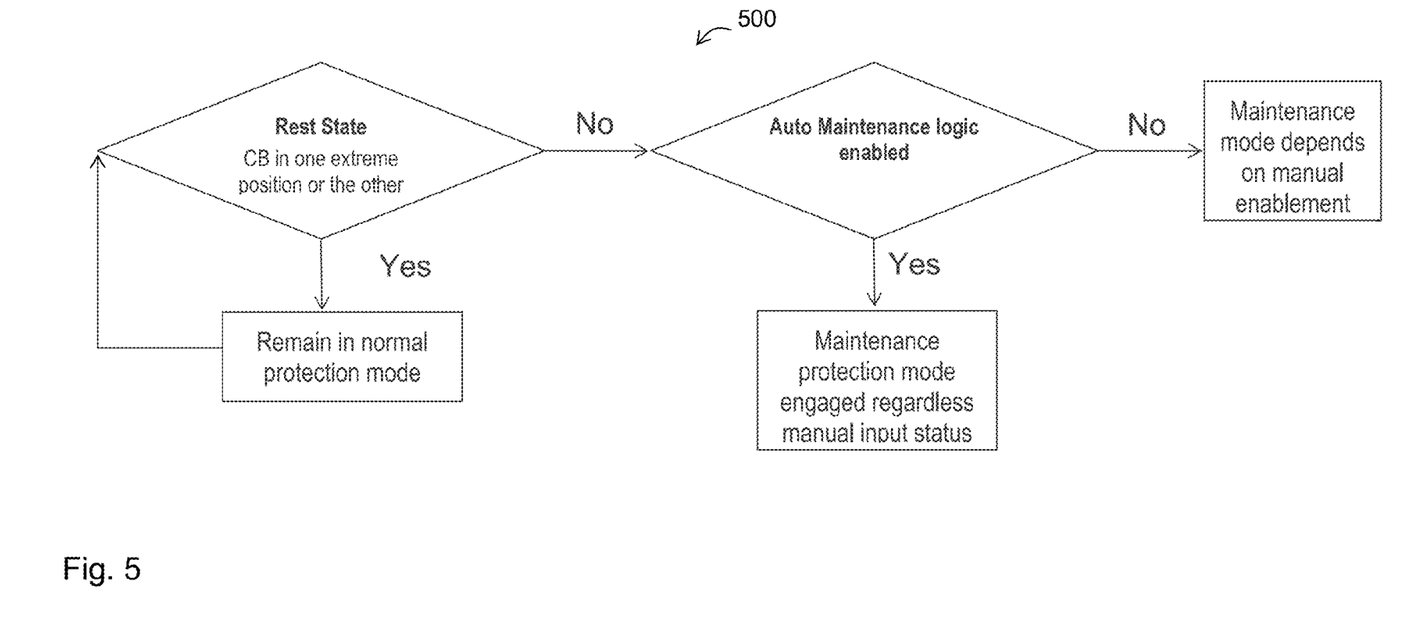
FIG. 5 is a flowchart of a method performed by an upstream protection assembly in a power system.

FIG. 5 is a flowchart of a method 500 performed by an upstream protection assembly in a power system, such as system 100. For clarity, method 500 will be described with reference to upstream protection assembly 104 and downstream protection assembly 106 in FIG. 1. Each protection assembly 104 and 106 includes a protection assembly 200 (shown in FIG. 204). According to method 500, upstream protection assembly 104 determines whether protection device 204 in downstream protection assembly 106 is in an extreme position (either fully engaged or fully disengaged). If protection device 204 in downstream protection assembly 106 is in an extreme position, upstream protection assembly 104 remains in its normal protection mode. If, instead, downstream protection assembly 106 is not in either extreme position, upstream protection assembly 104 determines if automatic maintenance protection mode switching is enabled. If automatic maintenance protection mode switching is enabled, upstream protection assembly 104 engages maintenance protection mode. If automatic maintenance protection mode switching is not enabled, upstream protection assembly 104 does not automatically enable maintenance protection mode. Embodiments operable to perform method 500 may include, or utilize, only sensors that detect whether protection device 204 is in either the fully engaged position or the fully disengaged position.

Figure 6:
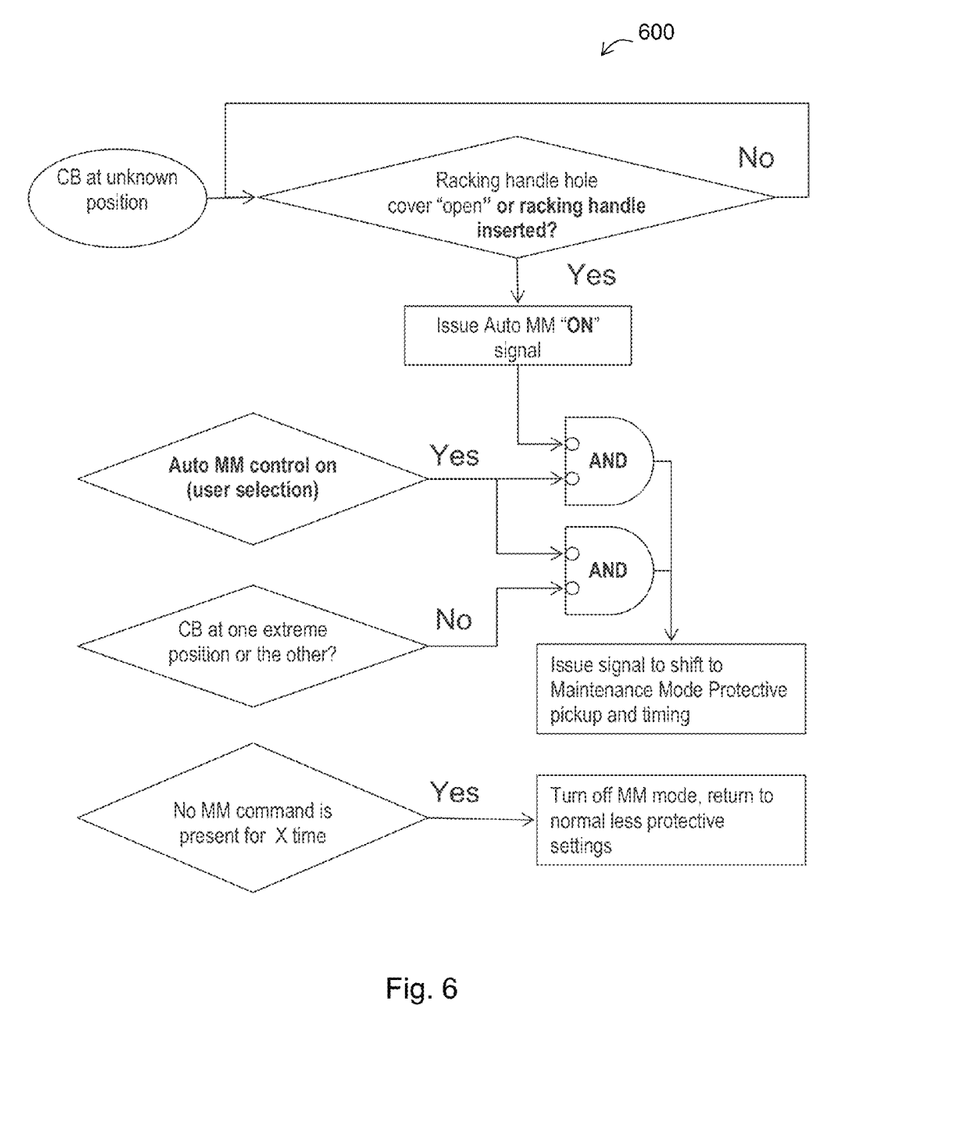
FIG. 6 is a flowchart of another method performed by an upstream protection assembly in a power system.

FIG. 6 is a flowchart of a method 600, respectively, performed by an upstream protection assembly in a power system, such as system 100. For clarity, method 600 will be described with reference to upstream protection assembly 104 and downstream protection assembly 106 in FIG. 1. Each protection assembly 104 and 106 includes a protection assembly 200 (shown in FIGS. 2-4). Embodiments operable to perform method 600 will typically include and/or utilize more sensors in downstream protection assembly 106 than were utilized in method 500. Generally, upstream protection assembly 104 determines if protection device 204 in downstream protection assembly is about to be moved or is between its extreme positions. If protection device 204 is in either extreme position and not being prepared for movement, upstream protection assembly 104 remains in its normal protection mode. If downstream protection assembly protective device 204 is being prepared for movement or not in an extreme position, upstream protection assembly 104 switches to the maintenance protection mode. Upstream protection assembly 104 determines whether downstream protection assembly 106 is being prepared for movement based on signals from downstream protection assembly 106 that indicate a cover over racking port 216 is open or a racking handle has been inserted into racking port 216. If either of these conditions is true, and automatic maintenance protection mode switching has been selected in upstream protection device 104, upstream protection device 104 causes its protection device 204 to shift to the maintenance protection mode. When the conditions that triggered, or could trigger, automatic shifting to maintenance mode cease, e.g., racking handle is removed, upstream protection device 104 returns to the normal protection mode. In some embodiments, the return to the normal protection mode is delayed for a predetermined period of time (X).

Figure 7:
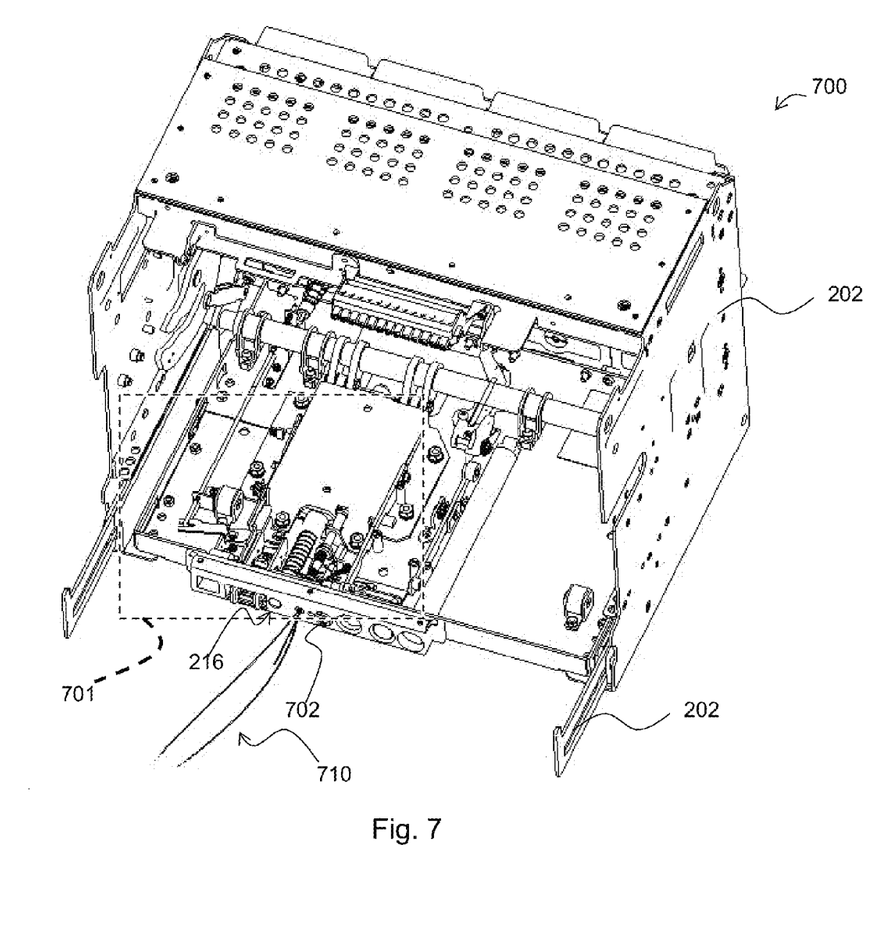
FIG. 7 is a protection assembly for use in the power system shown in FIG. 1
Figure 8:
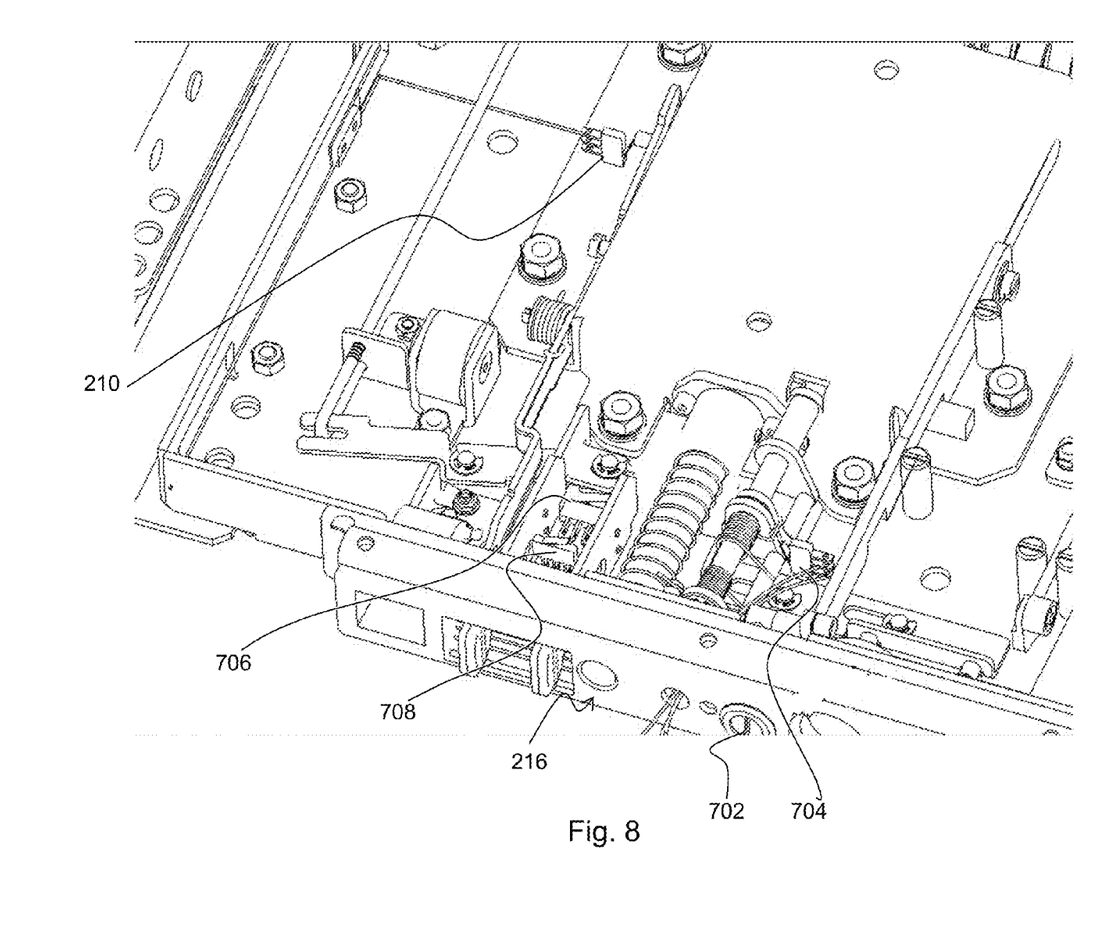
FIG. 8 is an enlarged view of a portion of the protection assembly shown in FIG. 7.

An exemplary protection assembly 700 with its protection device removed is shown in FIGS. 7 and 8. FIG. 8 is an enlarged view of section 701 of FIG. 7. Protection assembly 700 is similar to protection assembly 200, and the same reference numerals refer to common components. Protection assembly 700 includes an interlock 702 to enable racking port 216 to be accessed. Interlock 702 must be activated to permit a user to insert a racking handle into racking port 216 to move protection device 204. An interlock sensor 704 detects movement of interlock 702 to access the racking port 216. Switch 706 detects whether a position lock (not shown) is enabled. The position lock maintains protection device 204 in a fixed position relative to chassis 202 and is often used as part of lock-out-tag-out (LOTO) procedures. Protection assembly 700 is configured to permit protection device 204 to be physically removed from chassis 202. Switch 708 detects whether or not protection device 204 is physically mounted within chassis 202. Wires 710 communicatively couple protection assembly 700 to an upstream protection assembly. In particular signals from interlock sensor 704, switches 706 and 708, and sensor 210 are transmitted via wires 710 to an upstream protection device to permit the upstream protection device to determine when to automatically switch to a maintenance protection mode as described herein.

Figure 9:
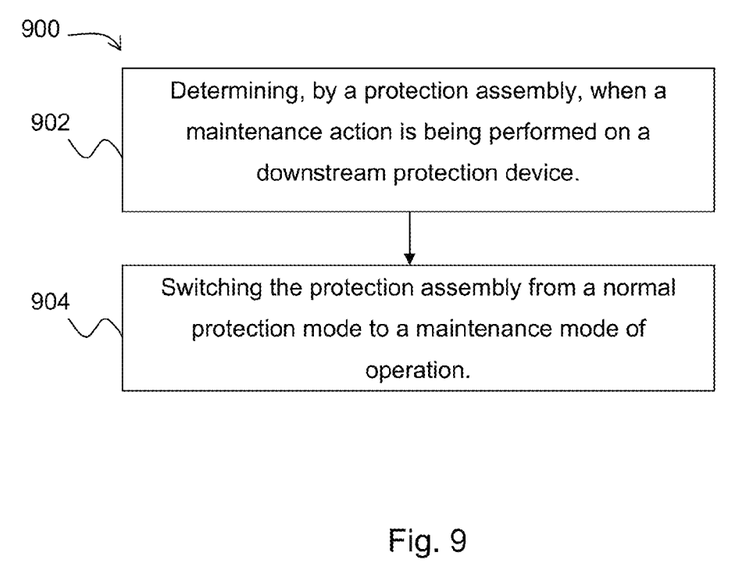
FIG. 9 is flowchart of a method for use in the power system shown in FIG. 1.

FIG. 9 is flowchart of a method 900 for use in a system, such as system 100, having a protection assembly, such as assembly 104, configured to receive power from an upstream power source, such as source 102, and provide power and protection to a downstream protection device moveable between a fully engaged position and a fully disengaged position. The method includes determining 502, by a protection assembly, when a maintenance action is being performed on a downstream protection device. The protection assembly is switched 504 from a normal protection mode to a maintenance mode of operation.

A technical effect of the method, device, and system described herein may include one or more of: (a) determining when a maintenance action is being performed on a downstream protection device; and (b) switching a protection assembly from a normal protection mode to a maintenance mode of operation.

Exemplary embodiments of a method, device, and system protection system activation and dynamic labeling are described above in detail. The method, device, and system are not limited to the specific embodiments described herein but, rather, operations of the method and/or components of the system and/or device may be utilized independently and separately from other operations and/or components described herein. Further, the described operations and/or components may also be defined in, or used in combination with, other systems, methods, and/or devices, and are not limited to practice with only the system, method, and device as described herein.

Although the present invention is described in connection with an exemplary protection system, embodiments of the invention are operational with numerous other protection systems, or other systems or devices. The protection system described herein is not intended to suggest any limitation as to the scope of use or functionality of any aspect of the invention. In addition, the protection system described herein should not be interpreted as having any dependency or requirement relating to any one or combination of components illustrated in the exemplary operating environment.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A protection assembly comprising:
   a chassis;

a protection device mounted to said chassis, said chassis configured to permit movement of said protection device attached to said chassis between a plurality of positions relative to said chassis, the plurality of positions including a fully engaged position and a fully disengaged position; and a first sensor assembly coupled to said chassis, said first sensor assembly configured to detect when said protection device is in an intermediate position between the fully engaged position and the fully disengaged position and generate a signal indicative of said protection device in the intermediate position.

2. A protection assembly in accordance with claim 1, further comprising a second sensor assembly configured to detect when said protection device is being prepared for potential movement to a different position relative to said chassis.

3. A protection assembly in accordance with claim 2, wherein said chassis includes a racking port configured to receive a removable racking handle for moving said protection device relative to said chassis, and wherein said second sensor assembly is configured to detect when the racking port is accessed by a person.

4. A protection assembly in accordance with claim 1, wherein said first sensor assembly is configured to detect when said protection device is in the fully engaged position or the fully disengaged position and generate a signal indicative of said protection device in the fully engaged position or the fully disengaged position.

5. A protection assembly in accordance with claim 4, wherein said first sensor assembly is further configured to generate a signal indicative of the protection device being moved when the protection device is not in the fully engaged position or the fully disengaged position.

6. A protection assembly in accordance with claim 1 wherein the first sensor assembly comprises a plurality of position switches and each position switch is coupled to a different position of said chassis.

7. A protection assembly in accordance with claim 1, wherein said protection device comprises a circuit breaker.

8. A protection assembly comprising:
an upstream protection device configured to receive power from an upstream power source and provide power and protection to a downstream protection assembly including a downstream protection device moveable between a fully engaged position and a fully disengaged position, said upstream protection device operable in a normal protection mode and a maintenance protection mode; and
a controller communicatively coupled said upstream protection device, said controller configured to:
switch said upstream protection device from the normal protection mode to the maintenance protection mode based at least in part on a signal from the downstream protection device indicative of the downstream protection device in an intermediate position between the fully engaged position and the fully disengaged position.

9. A protection assembly in accordance with claim 8 wherein said controller is configured to switch said upstream protection device from the maintenance protection mode to the normal protection mode based at least in part on a signal from the downstream protection device indicative of the downstream protection device in either the fully engaged position or the fully disengaged position.

10. A protection assembly in accordance with claim 9, wherein said controller is configured to delay switching said upstream protection device from the maintenance protection mode to the normal mode for a predetermined time after receiving the signal from the downstream protection device indicating the downstream protection device is in either the fully engaged position or the fully disengaged position.

11. A protection assembly in accordance with claim 8, wherein said controller is configurable to disable the switching from the normal protection mode to the maintenance protection mode based on the signal from the downstream protection device indicating the downstream protection device is in either the fully engaged position or the fully disengaged position.

12. A protection assembly in accordance with claim 8, wherein said controller is further configured to switch said upstream protection device from the normal protection mode to the maintenance protection mode based at least in part on a signal from the downstream protection device indicating the downstream protection device is being prepared for movement.

13. A method of controlling a protection assembly mode of operation, said method for use in a system having a protection assembly configured to receive power from an upstream power source and provide power and protection to a downstream protection device moveable between a fully engaged position and a fully disengaged position, said method comprising:
determining, by the protection assembly, a maintenance action is being performed on the downstream protection device in response to a downstream detection signal from the downstream protection device; and
switching the protection assembly from a normal protection mode to a maintenance mode of operation in response to said determining the maintenance action is being performed on the downstream protection device.

14. A method in accordance with claim 13, further comprising:
determining, by the downstream protection device, that the downstream protection device is not in either the fully engaged position or the fully disengaged position; and
providing, by the downstream protection device, the downstream detection signal to the protection assembly in response to said determining that the downstream protection device is not in either the fully engaged position or the fully disengaged position.

15. A method in accordance with claim 13, further comprising:
determining, by the downstream protection device, that the downstream protection device is being readied for movement; and
providing, by the downstream protection device, the downstream detection signal to the protection assembly in response to said determining that the downstream protection device is being prepared for movement.

16. A method in accordance with claim 15, wherein said determining that the downstream protection device is being prepared for movement comprises determining that a racking port in the downstream protection device has been accessed.

17. A method in accordance with claim 16, wherein said determining that the racking port in the downstream protection device has been accessed comprises determining that a cover to the racking port has been opened.

18. A method in accordance with claim 16, wherein said determining that the racking port in the downstream protection device has been accessed comprises determining that a racking handle has been inserted into the racking port.

19. A method in accordance with claim 13, further comprising:
   determining, by the protection assembly, that the maintenance action performed on the downstream protection device is completed; and
   switching the protection assembly from the maintenance protection mode to the normal mode of operation in response to said determining the maintenance action is completed.

\* \* \* \* \*